US011826836B2

(12) United States Patent
Pabel

(10) Patent No.: US 11,826,836 B2
(45) Date of Patent: Nov. 28, 2023

(54) ROTARY CUTTING INSERT AND TOOL HAVING DECLINED AXIAL SUPPORT SURFACES

(71) Applicant: SANDVIK INTELLECTUAL PROPERTY AB, Sandviken (SE)

(72) Inventor: Helena Pabel, Jarbo (SE)

(73) Assignee: Sandvik Intellectual Property AB, Sandviken (SE)

( * ) Notice: Subject to any disclaimer, the term of this patent is extended or adjusted under 35 U.S.C. 154(b) by 0 days.

(21) Appl. No.: 16/629,821

(22) PCT Filed: Jul. 4, 2018

(86) PCT No.: PCT/EP2018/068024
§ 371 (c)(1),
(2) Date: Jan. 9, 2020

(87) PCT Pub. No.: WO2019/011732
PCT Pub. Date: Jan. 17, 2019

(65) Prior Publication Data
US 2021/0146453 A1    May 20, 2021

(30) Foreign Application Priority Data
Jul. 10, 2017    (EP) ..................... 17180488

(51) Int. Cl.
*B23B 51/00*    (2006.01)
*B23B 51/02*    (2006.01)

(52) U.S. Cl.
CPC .......... *B23B 51/02* (2013.01); *B23B 51/0005* (2022.01); *B23B 2251/02* (2013.01); *B23B 2251/04* (2013.01)

(58) Field of Classification Search
CPC . B23B 2251/02; B23B 2240/04; B23B 51/02; B23B 2251/50; B23B 2251/04; B23B 51/0005
See application file for complete search history.

(56) References Cited

U.S. PATENT DOCUMENTS 6,506,003 B1 *  1/2003  Erickson ................. B23B 51/02
                                                         408/226
6,899,495 B2 *  5/2005  Hansson ................. B23B 51/02
                                                         408/144
7,048,480 B2 *  5/2006  Borschert ............... B23B 51/02
                                                         408/144

(Continued)

FOREIGN PATENT DOCUMENTS

DE              367010 C  *  1/1923  ............. B23B 51/02
DE       102004022747 A1    11/2005
(Continued)

OTHER PUBLICATIONS

Machine Translation, DE367010C. (Year: 1923).*

*Primary Examiner* — Nicole N Ramos
(74) *Attorney, Agent, or Firm* — Corinne R. Gorski

(57) ABSTRACT

A cutting insert for a rotary drill tool and drill tool assembly in which an insert and a support body are coupled via a plurality of axial support surfaces. The support surfaces include a first declined orientation in the axial direction and a second declined orientation in the circumferential direction, so as to manage and control transmission of loading forces at the region of mounting the insert at the support body.

9 Claims, 8 Drawing Sheets

(56) References Cited

U.S. PATENT DOCUMENTS

| | | |
|---|---|---|
| 7,625,161 B1 | 12/2009 | Ruy |
| 9,028,180 B2 * | 5/2015 | Hecht .................... B23B 51/02 408/230 |
| 2010/0322727 A1 | 12/2010 | Pabel |
| 2012/0315101 A1 * | 12/2012 | Osawa .................... B23B 51/02 408/226 |
| 2015/0104266 A1 | 4/2015 | Gutter |

FOREIGN PATENT DOCUMENTS

| | | |
|---|---|---|
| EP | 0118806 A1 | 9/1984 |
| JP | H10166283 | 6/1998 |
| JP | 2007083349 A | 4/2007 |
| WO | 2008014367 A1 | 1/2008 |
| WO | 2009128758 A1 | 10/2009 |

* cited by examiner

ROTARY CUTTING INSERT AND TOOL HAVING DECLINED AXIAL SUPPORT SURFACES

RELATED APPLICATION DATA

This application is a § 371 National Stage Application of PCT International Application No. PCT/EP2018/068024 filed Jul. 4, 2018 claiming priority to EP 17180488.3 filed on Jul. 10, 2017.

FIELD OF INVENTION

The present invention relates to a rotary drill tool insert and to a drill tool assembly in which the insert is mountable to a support body so as to maximise retention of the insert whilst minimising stress and fatigue at the support body.

BACKGROUND ART

Multi-component drilling tool assemblies have been developed in which an insert formed from a hard expensive material (such as a cemented carbide, ceramic or the like) is releasably axially and radially locked at a tool or carrier body formed from a lower hardness and less expensive material. The insert is typically regarded as a wear part and is provided with an axially forward facing cutting region that typically includes a series of cutting edges and cutting surfaces.

Control and management of the transmission of axial loading forces and torque from the insert to the drill body is required to securely mount the insert during use whilst enabling insert replacement once worn. Bayonet-type locking interfaces have been developed in an attempt to appropriately transfer such loading forces.

U.S. Pat. No. 7,625,161 discloses a rotary cutting tool assembly in which a cutting insert is releasably mounted at a tool shank alternatively termed a drill or support body. The insert is formed as a body having respective head and tail sections with axial loading forces being transferred from the insert into the shank via axial support surfaces. In an attempt to maximise the axial lock of the insert, the axial support surfaces are declined relative to a plane extending perpendicular to a longitudinal axis of the drill tool.

However, existing drill tool assemblies are disadvantageous in a number of respects. Firstly, mounting and removal of an insert within a rotary assembly of the aforementioned type is often difficult. Additionally, the loading forces of the above arrangements encountered during use would typically induce stress and fatigue at the mounting region of the drill shank leading to stress concentrations, cracks and shank failure. Accordingly, what is required is an insert and drill tool assembly that addresses these problems.

SUMMARY OF THE INVENTION

It is an objective of the present invention to provide a drill tool insert and drill tool assembly to control and manage transmission of loading forces and in particular torque and axial loading forces during use so as to maximise a locking strength by which the insert is retained at a support body (encompassing a drill body or shank) whilst minimising stress and fatigue at regions of the support body and potentially other components of the assembly (such as the insert).

It is a specific objective to provide an insert and a drill tool assembly that facilitates mounting and removal of the insert at the support body by managing and controlling the loading forces between the insert and the support body which may otherwise result in undesirable deformation the support body into non-releasable clamping engagement with the insert.

It is a further specific objective to maximise the service lifetime of the support body by minimising fatigue and stress concentrations at the regions of mounting the insert without compromising the strength by which the insert is axially and rotationally locked at the support body.

The objectives are achieved by providing a drill tool insert and a drill tool assembly having a tine-like interface between the insert and tool body in which axial support surfaces appropriately direct transmission of torque and axial and radial forces between the insert and the tool body. In particular, the inventors have identified that by providing such axial support surfaces with at least a first and a second declined orientation relative to a plane perpendicular to a longitudinal axis of the tool, an appropriate axial lock of the insert is achieved whilst minimising fatigue and undesirable stress concentrations within the mounting regions of the assembly that would otherwise result in fatigue or failure of some or all of the assembly components.

According to a first aspect of the present invention there is provided a cutting insert of a rotary drill tool for cutting metal comprising: a head and a neck extending along a longitudinal axis, the head having an axially forward facing cutting region and the neck having an axially rearward facing mount region, at least the neck capable of being releasably mountable within a jaw of a support body; the head having generally axially rearward facing axial support surfaces projecting radially outward from the neck for abutment with corresponding axial support surface of the support body; wherein said support surfaces comprise a first decline orientation aligned relative to a plane perpendicular to the longitudinal axis such that a radially outer region of each said surface is axially rearward relative to a radially inner region of each said surface; characterised in that: said support surfaces comprises a second decline orientation being additional to the first decline orientation and aligned to extend in a circumferential direction relative to the plane perpendicular to the longitudinal axis.

The first and second decline orientations are advantageous to direct and absorb the torque and axial loading forces according to a plurality of force transmission directions/orientations between the insert and the tool body. In particular, the first decline orientation is advantageous to direct force components radially inward towards the longitudinal axis of the support body. Optionally, the axial support surfaces of the insert may abut the corresponding axial support surfaces of the body partially or completely over the respective surface areas.

The second decline orientation, provides that a portion of the torque created by cutting forces during use is obtained by the axial support surfaces. In particular, some of tangential forces are instead directed towards the axial support surface such that the portion of the forces that would otherwise have been applied on specific separate torque transfer surfaces are directed axially downwards. This has a positive effect by reducing tool body fatigue. Additionally, the second decline orientation, by transmitting a portion of the torque, facilitates the clamping effect of the arms at the insert as force is divided into the support body and away from the retaining arms (to avoid undesirable arm bending). This provides that the arms of the tool body are not deformed in the circumferential to otherwise reduce torque transfer and potentially the desired axial and radial directing of forces. According to the subject invention, stress and fatigue at the mounting interfaces are managed and in particular limited appropriately. Such an arrangement is further advantageous to facilitate removal of the insert once worn.

The second decline orientation is further beneficial to allow mounting of the insert at the support body by a twisting or rotation about the longitudinal axis which provides a centering function of the insert at the tool body.

Preferably, the second decline orientation extends such that a lead region or edge of each said surface in a rotational direction of the insert is positioned axially rearward relative to a trailing region or edge of each said surface in a rotational direction of the insert. Such a configuration is advantageous to provide that a portion of the torque force is transferred from the support body to the insert and directed axially downward into the axially rearward region of the insert and axially forward region of the support body during cutting.

Additionally, the orientation of these axial support surfaces (and the partial transmission of torque) acts to increase the force by which the primary torque transfer surfaces of the arms engage the insert.

Optionally, reference to the support surfaces being 'declined' refers to the support surfaces being generally planar (i.e. flat) having a first and a second slope relative to a plane perpendicular to the axis of the tool and relative to a cutting tip or edge of the insert. Accordingly, the support surfaces have an orientation that slopes away from the axially forward tip or cutting edge in both a radial direction and a circumferential direction (alternatively referred to as a direction of a tangent to a circle, which has the central longitudinal axis of the insert or support body as centre.)

Optionally, along a direction of a tangent to a circle, which has the central longitudinal axis of the insert as centre, an angle ($\delta$) by which the second decline orientation is declined from said plane is in the range 1 to 50°, 1 to 45°, 1 to 30°, 1 to 20°, 2 to 20°, 1 to 15°, 2 to 15°, or more preferably 5 to 15°. The tangent to the circle may extend at any radial position of each respective support surface between a radially inner and a radially outer region (or edge) of each support surface. Optionally, the tangent may be positioned at a mid-radial region of each support surface between a radially inner and outer region (or edge) of each respective support surface. Angles greater than the recited ranges will not appropriately transfer axial loading forces between the insert and support body and will contribute to creating tangential directed forces that will in turn force the arms radially outward.

Optionally, an angle ($\theta$) by which the first decline orientation is declined from the plane is in the range 1 to 50°, 1 to 45°, 2 to 45°, 2 to 30°, 5 to 20°, 5 to 15°, or 10 to 15°. An angle less that the recited ranges would have little or no effect in forcing the arms radially inward to clamp the insert whilst orientations above the recited ranges will increase the magnitude of stress concentrations within the insert and the likelihood of crack propagation.

Preferably, said support surfaces are generally planar. In particular, the axial support surfaces of the insert and the support body are all planar or generally planar so as to maximise the surface area contact and provide generally uniform loading across the respective surfaces. However and optionally the axial support surfaces may be curved or angular.

Optionally, the insert further comprises at least one radial projection extending outwardly from the insert. Preferably, the radial projection extends from a radially inner surface region of the head that is positioned radially inside, and in the circumferential direction between, diametrically opposed lobes of the head. Preferably, the insert comprises two generally diametrically opposite first radial projections formed as ribs having a length extending in a circumferential direction capable of seating within a channel of the support body to axially secure the insert at the support body when retracting or moving the tool within the bore hole. The ribs comprise a length extending in the circumferential direction that is greater than a width (extending in the axial direction) and a depth (extending in the radial direction). This is beneficial to distribute the axial forces along the length of the ribs so as to avoid point loading and reduce the magnitude of or eliminate stress concentrations that may otherwise be encountered if the projections were non-elongate in the circumferential direction.

Optionally, the insert further comprises at least one second radial projection extending from the radially inner surface region of the head and formed as a raised bump to provide the tactile snap-click when the insert is rotated to mate with the support body. This provides that an operator can confirm when the insert is fully mated in position whilst not interfering with the centring surfaces. The second radial projection comprises a depth in the radial direction being appreciably less than the corresponding depth of the first radial projection such that the second radial projection has little or no effect in axially locking the insert at the support body.

Preferably, the neck of the insert is defined by at least one curved radially outer surface that is devoid of any radially outward projection at an axial position below the head of the insert. This curved surface can be the radially outermost surface of the neck and being completely or entirely cylindrical. Accordingly the insert is configured for maximised centring and is obtainable by efficient manufacturing techniques and/or process (i.e. that avoid grinding or greatly facilitate grinding if required). Preferably, the head of the insert is formed by a pair of generally diametrically opposed lobes each having a radially outermost envelope surface configured to cooperate with, for example align generally with, corresponding radially outer envelope surfaces of the support body, wherein at least some surfaces of the lobes in part define an axially forward region of axially extending chip flutes of the support body. Preferably, the first projection and the second projection are positioned in a circumferential direction between each of the lobes. In particular, the first (and second) radial projections extend from a radially inner surface of the head that is aligned at an approximate corresponding radial position of the curved surface of the neck. In particular, the surface from which the first (and second) projections extend may be considered to be an axial extension of the neck surface, i.e., being aligned approximately at the same radial position (relative to the longitudinal axis). As such, the first (and second) projections are positioned radially inward of all or the majority of the lobes of the head. This relative positioning is beneficial to maximise the function of the axial support surfaces and torque transmission surfaces and in particular the transmission of such forces between the insert and support body. Accordingly, these surfaces and their respective component portions may be optimised for their specific functions.

Preferably, each of the lobes comprise a radially and axially extending torque transfer surface for abutment contact with a corresponding torque transfer surface of the support body; wherein in plane extending perpendicular to the longitudinal axis, the torque transfer surface of the insert is orientated relative to the radius of the head at an angle ($\alpha$) in the range 0 to 60°, 0 to 50°, 0 to 45°, 1 to 50°, 1 to 45°, 1 to 30°, 1 to 20°, 2 to 20°, or 3 to 15°. This relative orientation of the torque transfer surfaces achieves the desired transmission of radial forces encountered during cutting whilst maintaining the arms radially retained to clamp the insert in response to torque forces. The orientation of the torque transfer surfaces may be positive or negative relative to the radius so as to be inclined or declined relative to the rotational direction.

According to a second aspect of the present invention there is provided a rotary drill tool for cutting metal comprising: an insert as claimed herein; and a support body extending along the longitudinal axis and terminated at an axially forward end by at least two axially extending arms, the arms spaced apart about the axis so as to define the jaw; each arm having a shoulder presenting a generally axially forward facing axial support surface, said support surfaces comprising: a first decline orientation aligned relative to the plane perpendicular to the longitudinal axis such that a radially outer region of each said surface is axially rearward relative to a radially inner region of each said surface; and a second decline orientation being additional to the first decline orientation and aligned to extend in a circumferential direction relative to the plane perpendicular to the longitudinal axis; wherein the insert is releasably mountable within the jaw and retainable in a mounted position by at least regions of the arms such that the axial support surfaces of the insert and the support body are configured for abutment with one another respectively.

Preferably, the arms of the support body at a radially inner surface each comprise a channel having a length extending in a circumferential direction, each of the channels positioned axially at or forward of the shoulder of each arm and configured to receive respectively the ribs of the insert to axially retain the insert at the support body. The projection and the channel comprise a complementary length, width and depth in the circumferential, axial and radial directions so as to allow the projections to be accommodated within the respective channel such that opposed contact surfaces are capable of abutting axially to axially lock the insert at the support body so as to prevent axial forward and rearward movement.

Preferably, a region of the jaw of the support body to receive the neck of the insert is part cylindrical and is defined by at least one curved radially inner surface that is devoid of any radially inward projection. Such an arrangement provides a complementary seating surface of the neck of the insert to contribute to the centering of the insert and the support body.

BRIEF DESCRIPTION OF DRAWINGS

A specific implementation of the present invention will now be described, by way of example only, and with reference to the accompanying drawings in which.

DETAILED DESCRIPTION OF PREFERRED EMBODIMENT OF THE INVENTION

Figure 1:
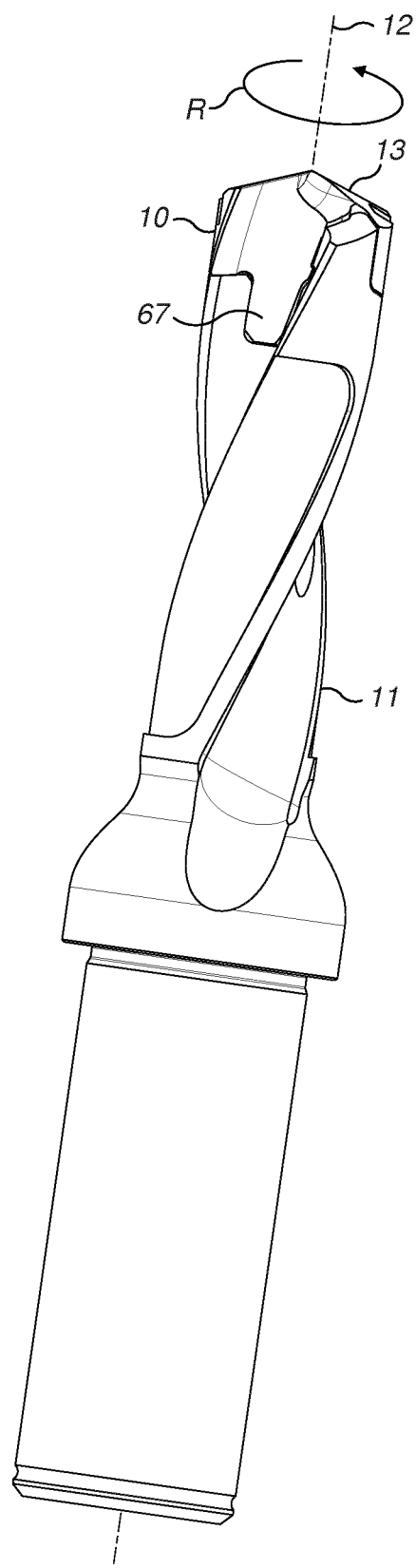
FIG. 1 is a perspective view of a drill tool assembly having an elongate support body releasably mounting at one axial end a cutting insert according to a specific implementation of the present invention.

Referring to FIG. 1 a cutting tool implemented as a drilling tool comprises an elongate support body 11. A cutting insert 10 is releasably mounted at an axially forward end of support body 11. Insert 10 comprises an axially forwardmost, axially forward facing cutting region 13 and an axially rearwardmost mount region 67. Mount region 67 and the axial forward end of support body 11 are shaped complementary to one another both axially and radially as described in detail below so as to provide control and management of the transmission of loading forces between insert 10 and support body 11 during use. Such loading forces include axial and radial forces in addition to torque resultant from the rotation of the cutting tool in direction R about a central longitudinal axis 12 extending though insert 10 and support body 11.

Figure 2:
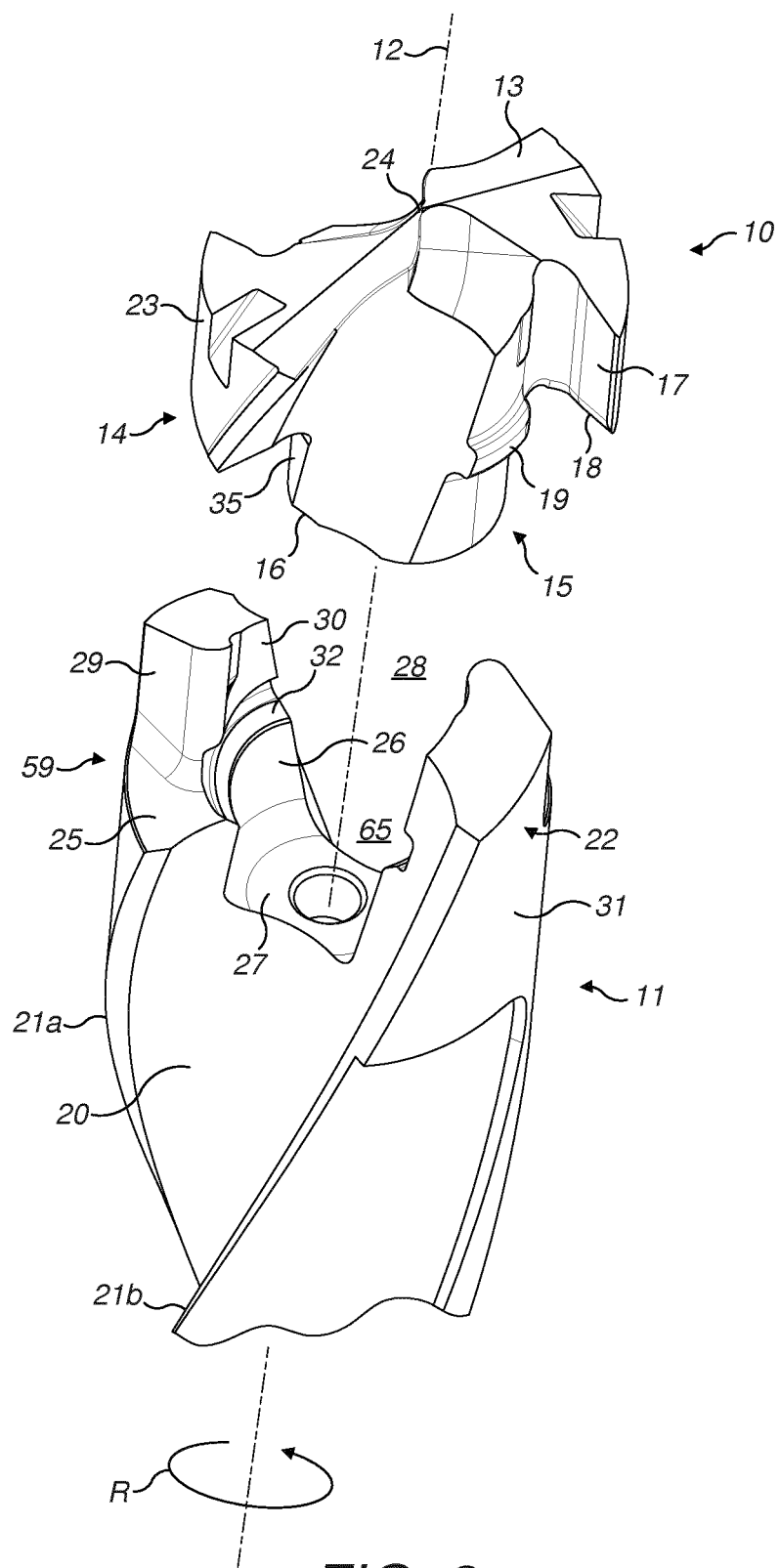
FIG. 2 is an exploded magnified view of the cutting insert positioned for mounting at the axial forward end of the support body of FIG. 1.

Referring to FIG. 2, insert 10 may be considered to comprise an axially forward head 14 being radially enlarged relative to a generally cylindrical central neck 15 from which the head extends. As detailed in FIGS. 3 and 6, head 14 is formed generally by a pair of diametrically opposed lobes 33 that project radially outward from axis 12 and neck 15. Forward facing cutting region 13 extends over lobes 33 and the inner central portion of insert 10 and is generally part conical (or domed) having a central axially forwardmost cutting tip 24 from which extend radially outward a series of cutting edges and corresponding cutting surfaces. Each of the lobes 33 are terminated at their axially rearward end by an undercut so as to present generally axially rearward facing axial support surfaces 18. Surfaces 18 project radially outward from an axially forward region of the central neck 15. Each lobe 33 further comprises a torque transfer surface 17 having a length extending axially and a width extending generally radially. Each torque transfer surface 17 extends axially between the rearward facing axial support surfaces 18 and the forward facing cutting region 13. Additionally, torque transfer surfaces 17 are positioned so as to extend readily inward from a radial perimeter of the lobes 33. Head 14 comprises radially outward facing envelope surfaces 23 (formed at the radially outer regions of the lobes and neck 15 comprises a corresponding radially outward facing generally cylindrical (or slight conical) surface 35. A projection 19 extends radially outward from an axially rearward portion of head 14 and in a circumferential direction between each of the lobes 33 as detailed further below. Accordingly, insert 10 comprises two diametrically opposed radial projections 19. Neck 15 is terminated at its axially rearward end by a part circular planar base surface 16.

Elongate support body 11 may be considered to comprise a pair of diametrically opposed elongate members that are twisted about axis 12 so as to extend along a helical path and define between them axially extending helical chip flutes 20 defined between an axially extending trailing edge 21a and a corresponding axially extending leading edge 21b relative to the rotational direction R. Support body 11, at its axially forward end, comprises a pair of retaining arms indicated generally by reference 22 spaced apart about axis 12 so as to be diametrically opposite one another. A jaw 28 is defined radially between arms 22 and is configured to releasably mount insert neck 15 and lobes 33. In particular, radially inward facing surfaces of arms 22 define the jaw 28 with such surfaces including part cylindrical surfaces 26 that between them define a base cavity 65 to receive and releasably mount neck 15. Arms 22 also comprise radially inward facing locating surfaces 30 (positioned towards the axial forwardmost ends of arms 22) for positioning opposed to/against radially inner surface regions of head 14 (between lobes 33 in a circumferential direction). The inward facing surfaces 26 and 30 are separated axially by a channel 32 extending in a circumferential direction around axis 12 along a full width of each arm 22 (in the circumferential direction). Each channel 32 is appropriately dimensioned so as to receive each respective projection 19 to axially lock insert 10 at support body 11 when mounted in position as illustrated in FIG. 1. Cavity 65 comprises a base surface 27 configured to be positioned opposed to insert base surface 16. With insert 10 mounted in position at support body 11 as illustrated in FIG. 1, insert envelope surfaces 23 are aligned to be positioned generally coplanar with corresponding radially outward facing envelopes surfaces 31 of support body 11.

Each arm 22 comprises a shoulder indicated generally by reference 59 positioned axially at the same position as channel 32 at the axial junction between arm inward facing surfaces 26 and 30. Each shoulder 59 presents an axially forward facing axial support surface 25 being dimensioned and aligned complimentary with the axial support surfaces 18 of insert 10. That is, with insert 10 mounted in position at support body 11 (as illustrated in FIG. 1), the insert and support body axial support surfaces 18, 25 are configured to abut one another and provide transmission of axial forces between insert 10 and support body 11. Each shoulder 59 also comprises a respective torque transmission surface 29 being dimensioned and aligned so as to be complementary with the insert torque transmission surfaces 17 to provide transmission of torque forces from support body 11 to insert 10 during rotation R about axis 12.

Figure 3:
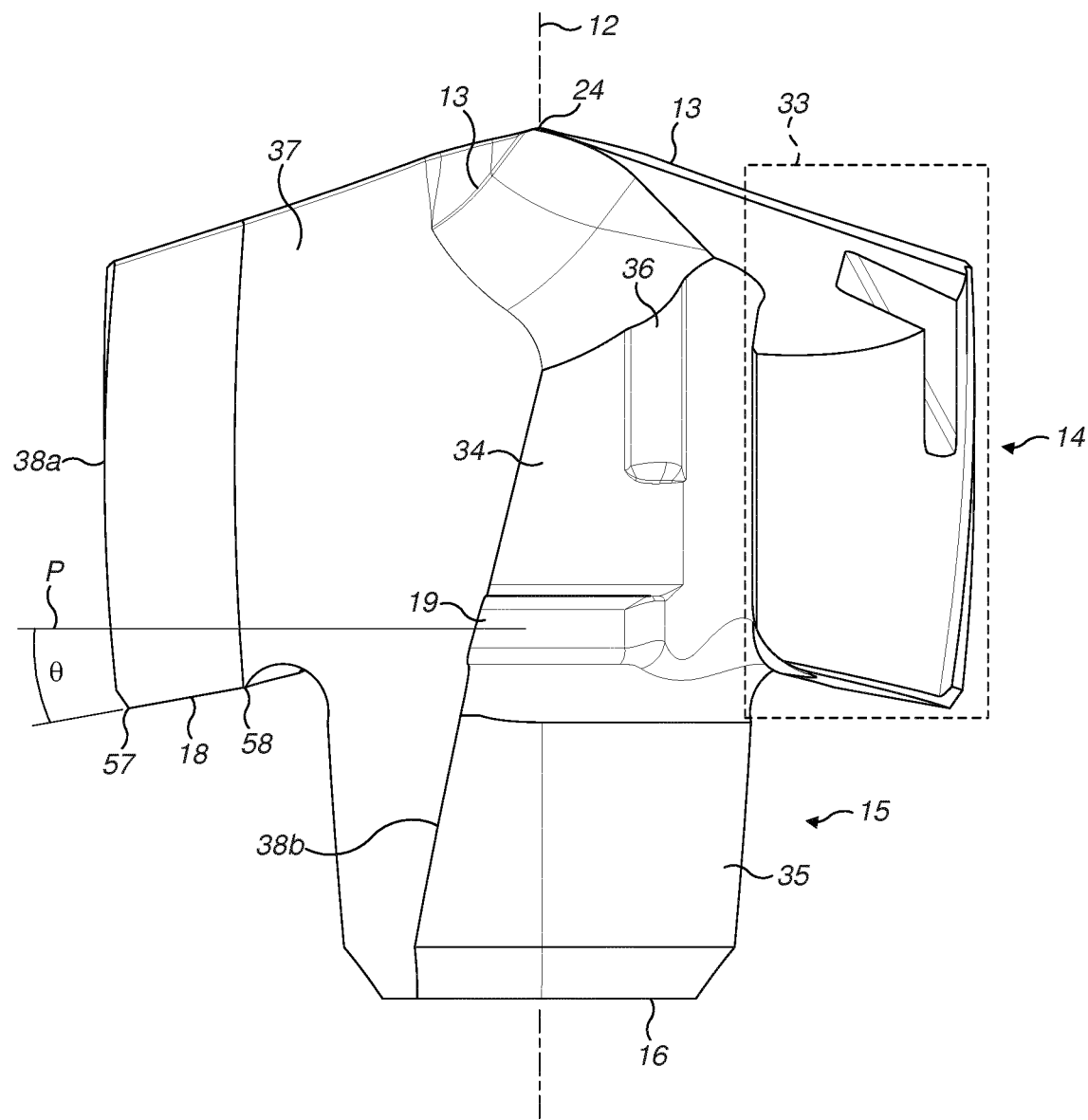
FIG. 3 is a side elevation view of the insert of FIG. 2.

Referring to FIGS. 2 and 3, head lobes 33 are, in part, defined and separated in a circumferential direction by a concaved curved surface 37 recessed radially into head 14 and neck 15. Concave surface 37, in the circumferential direction is defined at one end by a trailing edge 38a and at the opposite end by leading edge 38b. Insert 10 comprises two diametrically opposite concave surfaces 37 (and corresponding pairs of edges 38a, 38b) that extend the complete (or almost complete) axial height of insert 10 between base surface 16 and cutting region 13 and are dimensioned and orientated so as to form axial extensions of chip flutes 20 at support body 11. In the circumferential direction, chip flute edge 38b defines one axial extending lengthwise side of a locating surface 34 that extends in a short circumferential distance between a trailing end of each lobe 33 and chip flute concave surface 37. Radial projection 19 is positioned at a trailing lengthwise end of locating surface 34 and also extends in a circumferential direction between the trailing end of each lobe 33 and edge 38b. An axially forward end of locating surface 34 terminates at the forward facing cutting region 13 with each locating surface 34 being generally part cylindrical and having a similar radius to the cylindrical neck surface 35 (relative to common axis 12).

A second radial projection 36 extends radially outward from an axially forward half of locating surface 34. Second projection 36 is positioned in a circumferential direction closer to the trailing end of each lobe 33 relative to concave surface edge 38b. Additionally, second projection 36 is axially separated from projection 19. As illustrated in FIG. 3, projection 19 may be considered to be formed as a rib, ridge or shelf having a length extending in the circumferential direction, a width extending in the axial direction and a depth extending in the radial direction (relative to locating surface 34). In contrast, second projection 36 comprises a radial depth being less than 10% or 5% of the corresponding radial depth of projection 19 (relative to locating surface 34) with second projection 36 having a length extending in the axial direction being approximately equal to an axial forward half of locating surface 34. As such, second projection 36 may be regarded as a raised bump projecting from locating surface 34.

Figure 7:
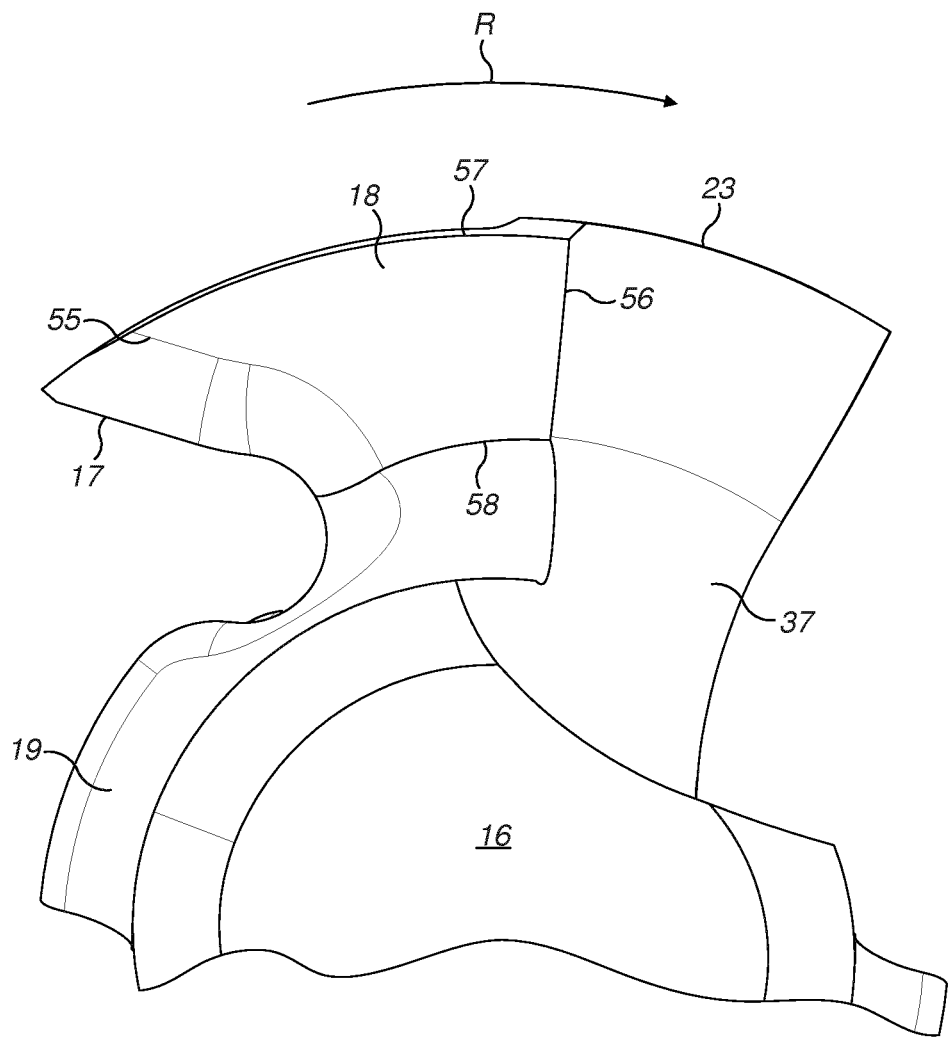
FIG. 7 is an underside view of the insert of FIG. 6.

Referring to FIGS. 3 and 7, each head lobe 33 is defined at its axially rearward end by a rearward facing axial support surface 18. Each surface 18 relative to a plane P (aligned perpendicular to axis 12) may be considered to be declined at an angle θ such that a radially outer widthwise end region 57 of surface 18 is positioned axially rearward relative to a radially inner widthwise end region 58.

Figure 4:
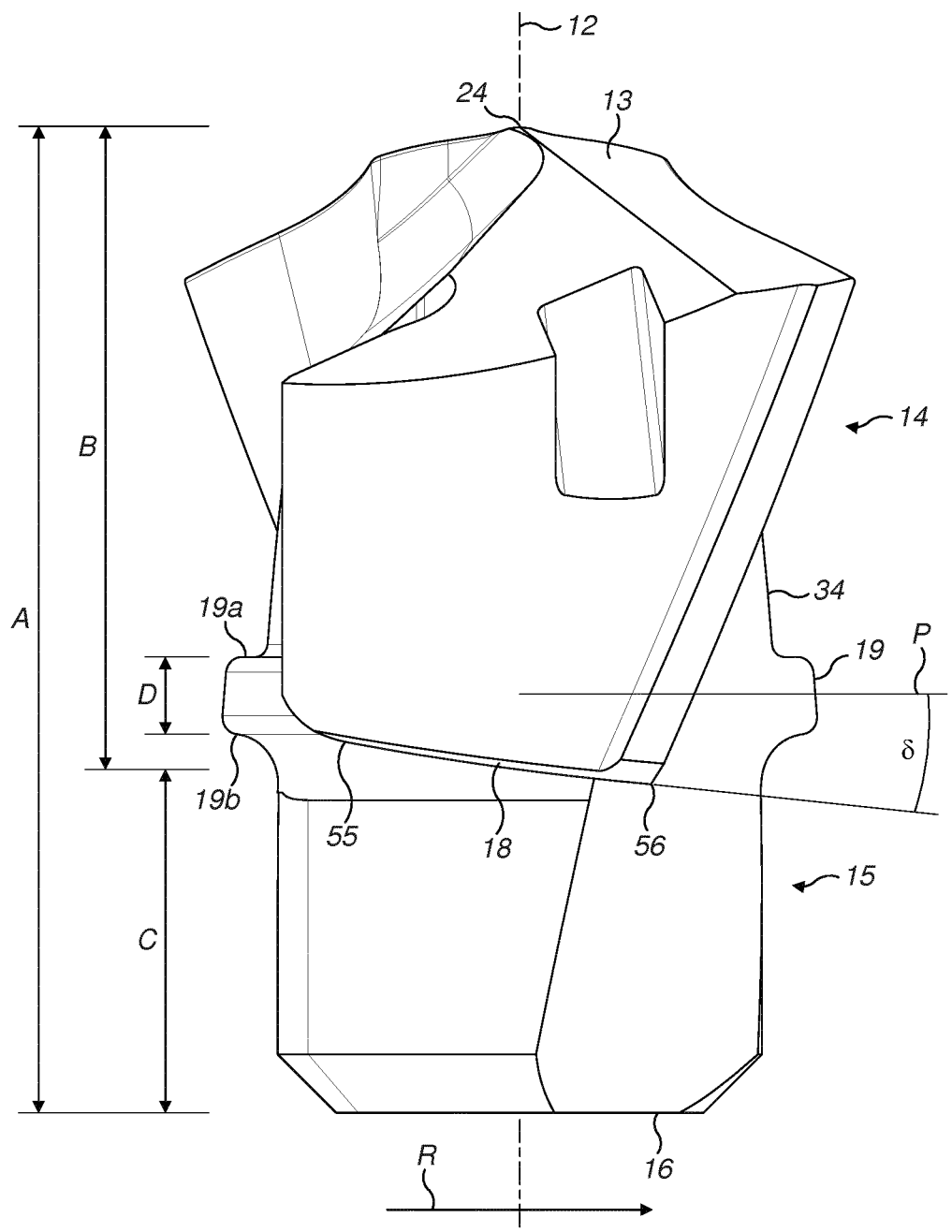
FIG. 4 is a further side view of the insert of FIG. 3 rotated through 90° about its central longitudinal axis relative to the view of FIG. 2.

As illustrated in FIGS. 4 and 7, each axial support surface 18 comprises a second declined orientation extending in a circumferential direction and rotational direction R. Relative to the axially perpendicular plane P, each surface 18 is declined in the circumferential direction such that a leading lengthwise end region 56 of surface 18 is positioned axially rearward relative to a trailing lengthwise end region 55 with respect to the rotational direction R. In particular, each surface 18 is declined in the circumferential direction from plane P by angle δ.

According to the specific implementation, A is in a range 5 to 15° and δ is in a range 3 to 15°. As illustrated in FIGS. 3 and 4, each axial support surface 18 is located at approximately the same axial position as projection 19 such that the axially forward widthwise and lengthwise end regions 58, 55 (of surface 18) are positioned at or close to an axially rearward part of projection 19. Additionally, surfaces 18 are positioned at the junction between neck 15 and head 14. Each axial support surface 18 (within the perimeter defined by widthwise and lengthwise end regions 57, 58, 55 and 56) is generally planar.

Figure 5:
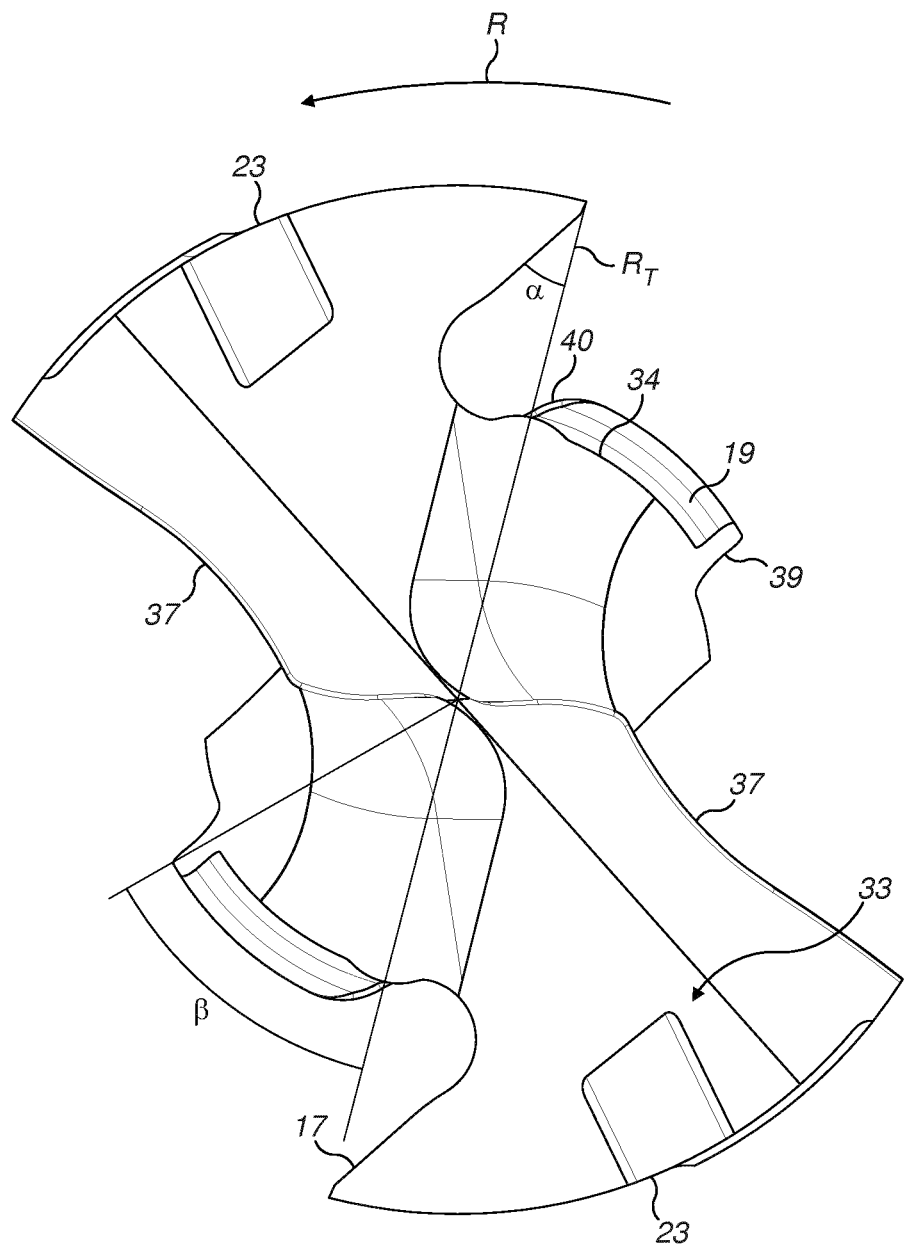
FIG. 5 is a plan view of the insert of FIG. 4.

Referring to FIG. 5, each lobe torque transfer surface 17 is positioned in the rotational direction R at the trailing end of each lobe 33 so as to be abutted by the corresponding support body torque transfer surface 29 of each respective arm 22 to allow transmission of the rotational drive from body 11 to insert 10. Each torque transfer surface 17, 29 is planar and comprises a length extending in the axial direction being greater than a corresponding width extending in the radial direction. According to the specific implementation, each torque transfer surface 17, 29 is generally rectangular. In the plane P each insert torque transfer surface 17 is orientated to be transverse to the radius $R_T$ of head 14. In particular, each torque transfer surface extends at an acute angle α relative to radius $R_T$ where α according to the specific implementation is in a range 0 to 60°. According to further specific implementations, each surface 17 may be orientated in the opposite (negative) acute angle relative to radius $R_T$ where the equivalent negative a may be in the range−45 to 0°. Accordingly, relative to $R_T$, α may extend from −45° to 60°.

Figure 6:
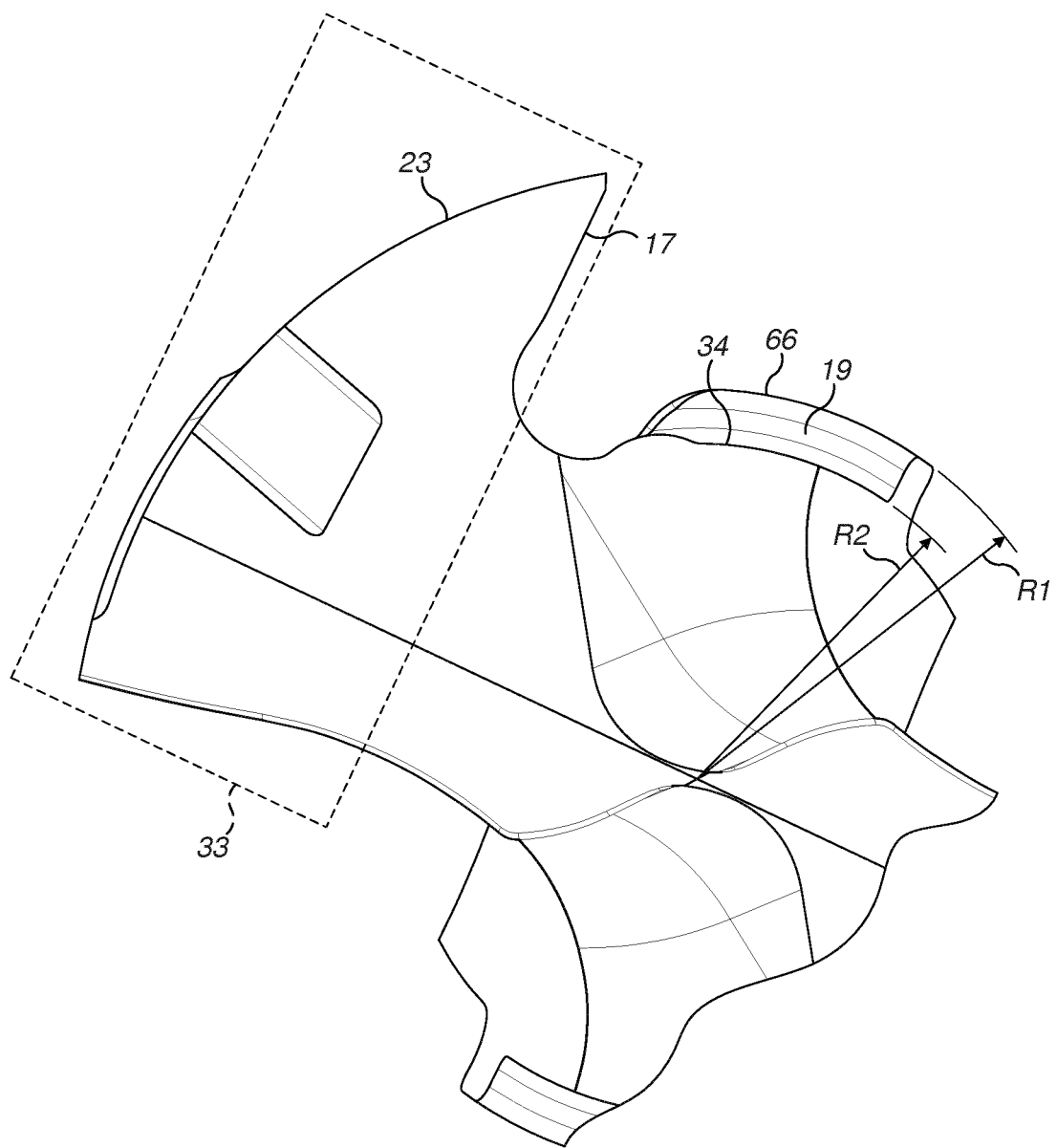
FIG. 6 is a further magnified plan view of the insert of FIG. 5.

As indicated, projection 19 comprises a length extending in the circumferential or rotational direction R having a first leading lengthwise end 40 and a second trailing lengthwise end 39. The angular length β of which projection 19 extends in the circumferential (rotational) direction is in a range 5 to 60°. According to the specific implementation, leading lengthwise end 40 is tapered relative to trailing lengthwise end 39 so as to provide a generally smooth transition from locating surface 34 to a radially outermost surface 66 that defines the radially outer perimeter of projection 19. Referring to FIG. 6, the radial depth of projection 19 may be defined at the difference between a radius R1 (at outermost surface 66) and a radius R2 (at locating surface 34). According to specific implementations, a quotient R2/R1 may be in the range 1.025 to 1.5; 1.025 to 1.4 or more preferably 1.05 to 1.3. Additionally, a radial width of projection 19 (the difference between R1 and R2) may be in the range 10 to 30% of a maximum radius $R_T$ corresponding to the radius between axis 12 and envelope surface 23.

Referring to FIG. 4, insert 10 comprises a total axial length A defined between base surface 16 and cutting tip 24; a head axial length B defined between a mid-length region (between end regions 55, 56) of each axial support surface 18 and cutting tip 24; a neck axial length C defined between base surface 16 and the mid-length region of each axial support surface 18. Projection 19 comprises a width D in the axial direction being the axial distance over which projection 19 extends between an axial forward end wall face 19a and a corresponding axial rearward end wall face 19b. According to the specific implementation, a quotient of D/A is in the range 0.05 to 0.1; a quotient of D/B is in the range 0.05 to 0.15; a quotient of C/B is in the range 0.2 to 1.0.

Figure 8:
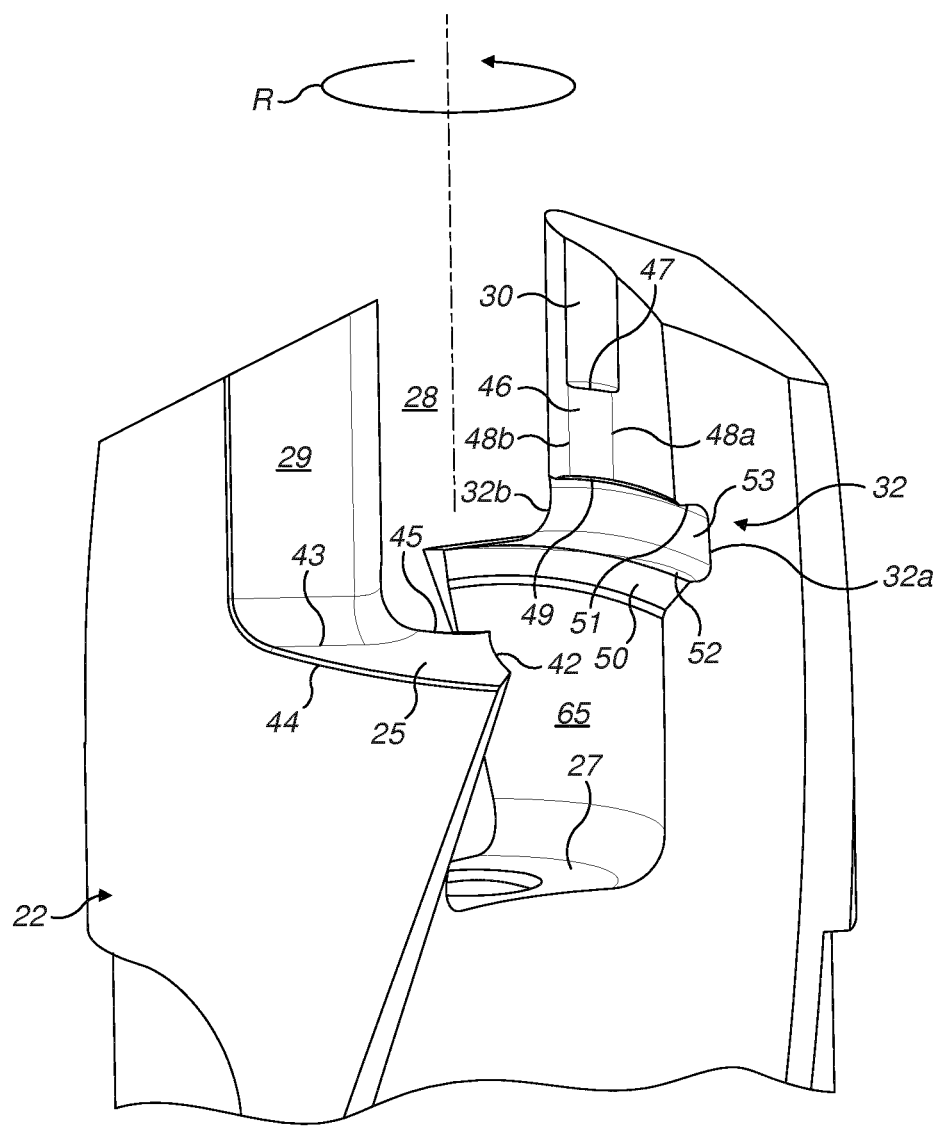
FIG. 8 is a perspective view of an axially forward insert mounting region of the support body of FIG. 2.

Referring to FIG. 8, and as detailed with reference to FIG. 2, each bayonet arm 22 comprises a corresponding axial support surface 25 having a length extending in the circumferential (rotational) direction between a forward end region 42 and a trailing end region 43 together with a corresponding radial width defined between a radially inner end region 45 and a radially outer end region 44. Each surface 25 comprises the same dual first and second declined orientation as detailed with respect to axial support surfaces 18 of insert 10. In particular, each axial support surface 25 is declined from plane P in the axial direction by the same angle θ and is also declined in the circumferential (rotational) direction relative to plane P by the same angle δ. Accordingly, surfaces 18 and 25 are configured to align in complete touching contact over substantially their complete respective surface areas. Similarly, each of the torque transfer surfaces 29 at support body 11 extend at the same or a similar acute angle α relative to radius $R_T$ where angle α may be positive or negative relative to $R_T$.

Channel 32 positioned at the shoulder 59 of each arm 22 comprises a length extending in the circumferential (rotational) direction corresponding to the angular length β of projection 19 in addition to comprising a corresponding radial depth being similar to the quotient R1/R2 so as to accommodate projection 19 within channel 32. As such, at least a part of each arm 22 overlaps radially each projection 19 so as to axially lock insert 10 at support body 11. In particular, each channel 32 comprises a corresponding lengthwise end 32a, 32b and a pair of lengthwise extending sidewalls 51, 52 that define the radial depth of each channel 32. With each projection 19 located within each channel 32, the lengthwise extending wall surfaces 19a and 19b (of projections 19) are capable of abutting the corresponding lengthwise extending walls 51, 52 of channels 32 to provide the axial lock in the forward direction (the direction acting to separate the insert from the support body). Additionally, each channel is further defined by a part cylindrical radially inward surface 53 configured for positioning opposed to the cylindrical radially outermost surface 66 (of each projection 19). Each channel lengthwise end 32a, 32b is 'open' so as to allow insert 10 to be rotated about axis 12 to introduce and receive projection 19 within channel 32. The axially rearwardmost channel wall 52 transitions into a declined surface 50 (having a length also extending in the circumferential direction) which transitions axially rearward to define cavity 65 configured to accommodate insert neck 15.

The radially inward facing locating surface 30 of each arm 22 comprises a radially recessed pocket 46 defined by a pair of axial end edges 47, 49 and a corresponding pair of opposed side edges 48a, 48b (separated in the circumferential direction). Each arm pocket 46 comprises a length and a width (in the axial and circumferential directions) to accommodate each respective second projection 36. In particular, as insert 10 is rotated into position between arms 22 (within jaw 28) each second projection 36 when received within each respective pocket 46 provides a corresponding snap-click tactile indication (as the projection 36 slides over side edges 48a, 48b).

In use, the first declined orientation of axial support surfaces 18, 25 (at the respective angle θ) is advantageous to direct a portion of the axial loading forces radially inward so as that arms 22 compress radially onto insert neck 15 with the sufficient magnitude to axially and rotationally hold insert 10 in mounted position within the jaw 28. The second decline orientation of surfaces 18, 25 (at the respective angle δ) is configured to control and manage the direction and magnitude of the torque and the axially and radially orientated forces as they are transmitted between insert 10 and support body 11. In particular, the second decline orientation is adapted to effectively limit the magnitude of the radially inward directed forces to prevent stress concentrations at the retaining arms 22 that would otherwise shorten or terminate the service lifetime of the support body 11.

The axial locking of insert 10 at support body 11, i.e. the locking against axial separation, is provided by the radial overlap of projections 19 and channels 32. By positioning projections 19 and channels 32 axially forward of neck 15 and cavity 65, a relative surface area (and volume and mass of material) of the neck 15 may be maximised so as to enhance the 'centring' of the insert 10 at support body 11 with respect to axis 12.

Additionally, the relative axial position of the projections 19 is advantageous to facilitate manufacturing of the insert 10 either by a moulding technique (in which a need for precision machining/grinding may obviated) or by casting followed by precision grinding of the cylindrical surface 35. In particular, according to the present invention there are no projections or channels that may otherwise obstruct a grinding tool at the region of the neck 15.

The invention claimed is:

1. A cutting insert of a rotary drill tool for cutting metal comprising:
    a head and a neck extending along a longitudinal axis, the head having an axially forward facing cutting region and the neck having an axially rearward facing mount region, at least the neck being arranged to be rotationally, releasably mountable within a jaw of a support body, the head having axially rearward facing axial support surfaces projecting radially outward from the neck, for abutment with corresponding axial support surfaces of the support body, each of the support surfaces of the head including a first decline orientation aligned relative to a plane perpendicular to the longitudinal axis, such that a radially outer region of each said support surface of the head is axially rearward relative to a radially inner region of each said support surface of the head, each of said support surfaces of the head including a second decline orientation aligned to extend in a circumferential direction relative to the plane perpendicular to the longitudinal axis, wherein the second decline orientation extends such that a lead region or edge of each said support surface of the head in a rotational direction of the insert, is positioned axially rearward relative to a trailing region or edge of each said support surface in a rotational direction of the insert, and wherein the head of the insert is formed by a pair of diametrically opposed lobes each having a radially outermost envelope surface configured to align with corresponding radially outer envelope surfaces of the support body, and a substantially cylindrical locating surface defined between each of the opposed lobes: wherein the cutting insert has a total axial length A defined between a base structure and a cutting tip: the total axial length comprising a head axial length B defined between the cutting tip and a mid-length region extending between the trailing region or edge and the lead region or edge of each of the support surfaces, and a neck axial length C defined between the base surface and the mid-length region of each of the support surfaces, wherein a quotient of CB is in the range of 0.2 to 1.0; and two diametrically opposite first radial projections formed as ribs having a length extending in a circumferential direction and arranged to be seated within a channel of the support body to axially secure the insert to the support body, wherein each of the first radial projections is positioned in a circumferential direction between each of the lobes, and wherein each of the lobes include a radially and axially extending torque transfer surface for abutment contact with a corresponding torque transfer surface of the support body, wherein each of the radial projections extends from a cylindrical neck surface of the that is aligned at the same radial position as the cylindrical locating surface of the head, relative to the longitudinal axis.

2. The insert as claimed in claim 1, wherein along a direction of a tangent to a circle, which has the central longitudinal axis of the insert as centre, an angle by which the second decline orientation is declined from said plane is in the range of 1 to 50°, 1 to 45°, 1 to 30°, 1 to 20°, 2 to 20°, 1 to 15°, 2 to 15°, or 5 to 15°.

3. The insert as claimed in claim 1, wherein an angle by which the first decline orientation is declined from the plane is in the range of 1 to 50°, 1 to 45°, 2 to 45°, 2 to 30°, 5 to 20°, 5 to 15°, or 10 to 15°.

4. The insert as claimed in claim 1, wherein said support surfaces are generally planar.

5. The insert as claimed in claim 1, wherein the neck of the insert is part cylindrical and being defined by at least one curved radially outer surface that is devoid of any radially outward projection at an axial position below the head of the insert.

6. A rotary drill tool for cutting metal comprising:
an insert as claimed in claim 1; and
a support body extending along the longitudinal axis and terminated at an axially forward end by at least two axially extending arms, the arms spaced being apart about the axis so as to define the jaw, each arm having a shoulder presenting a generally axially forward facing axial support surface, said support surfaces of the support body including a first decline orientation aligned relative to the plane perpendicular to the longitudinal axis such that a radially outer region of each said support surface of the support body is axially rearward relative to a radially inner region of each said surface of the support body, and a second decline orientation being additional to the first decline orientation and aligned to extend in a circumferential direction relative to the plane perpendicular to the longitudinal axis, wherein the insert is releasably mountable within the jaw and retainable in a mounted position by at least regions of the arms such that the axial support surfaces of the insert and the support body are configured for abutment with one another respectively.

7. The tool as claimed in claim 6, wherein the arms of the support body at a radially inner surface each comprise a channel having a length extending in a circumferential direction, each of the channels positioned axially at or forward of the shoulder of each arm and configured to receive respectively the ribs of the insert to axially retain the insert at the support body.

8. The tool as claimed in claims 6, wherein a region of the jaw of the support body to receive the neck of the insert is part cylindrical and is defined by at least one curved radially inner surface that is devoid of any radially inward projection.

9. The insert as claimed in claim 1, wherein in the plane extending perpendicular to the longitudinal axis, the torque transfer surface of the insert is orientated relative to a radius of the head at an angle in the range of 0 to 60°, 0 to 50°, 0 to 45°, 1 to 50°, 1 to 45°, 1 to 30°, 1 to 20°, 2 to 20°, or 3 to 15°.

* * * * *